F. GRAEBER.
SEALING FOOD PACKAGES.
APPLICATION FILED APR. 26, 1913.
1,114,747.
Patented Oct. 27, 1914.
4 SHEETS—SHEET 2.
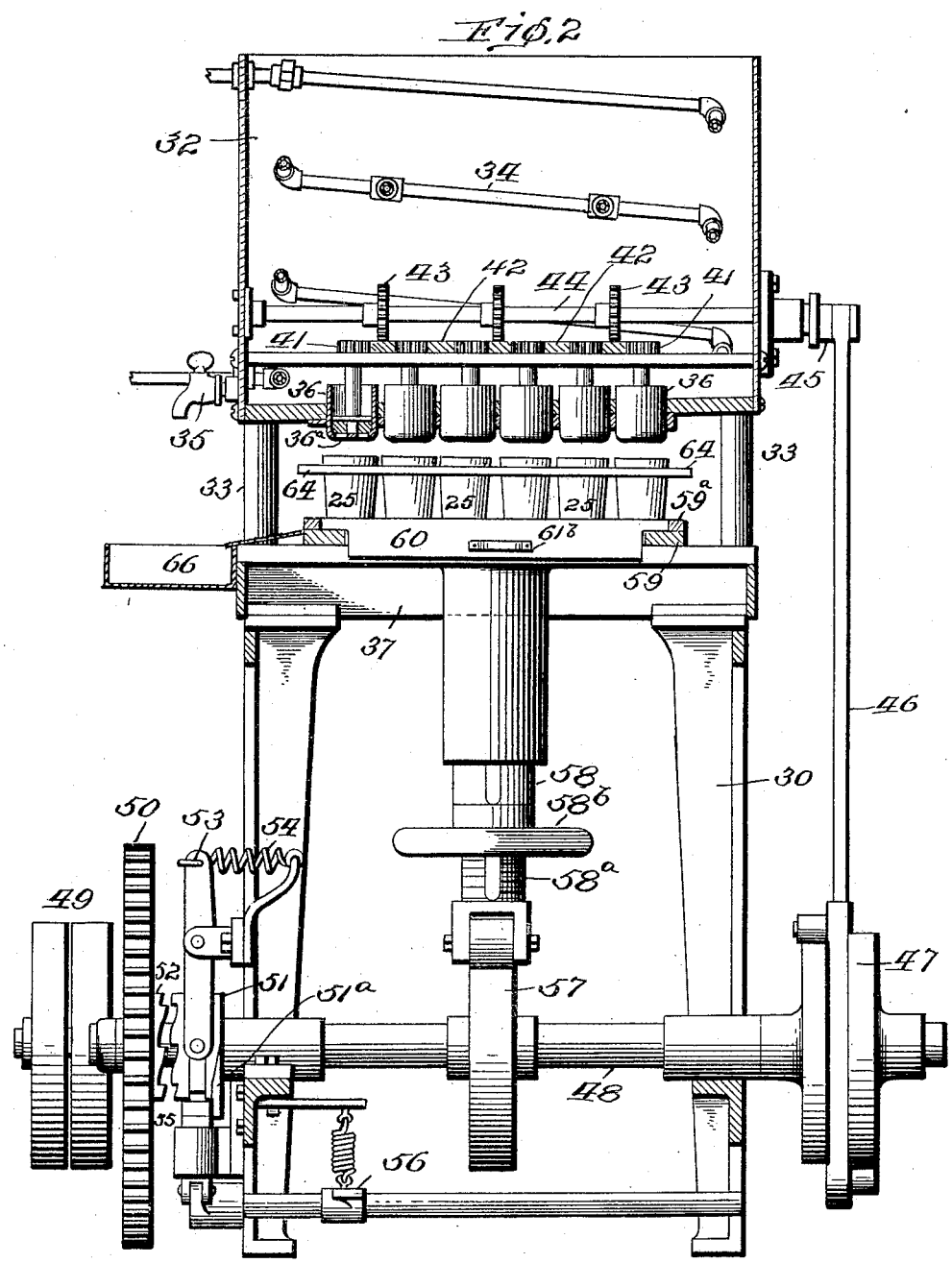
WITNESSES
INVENTOR
Frank Graeber
Attorney

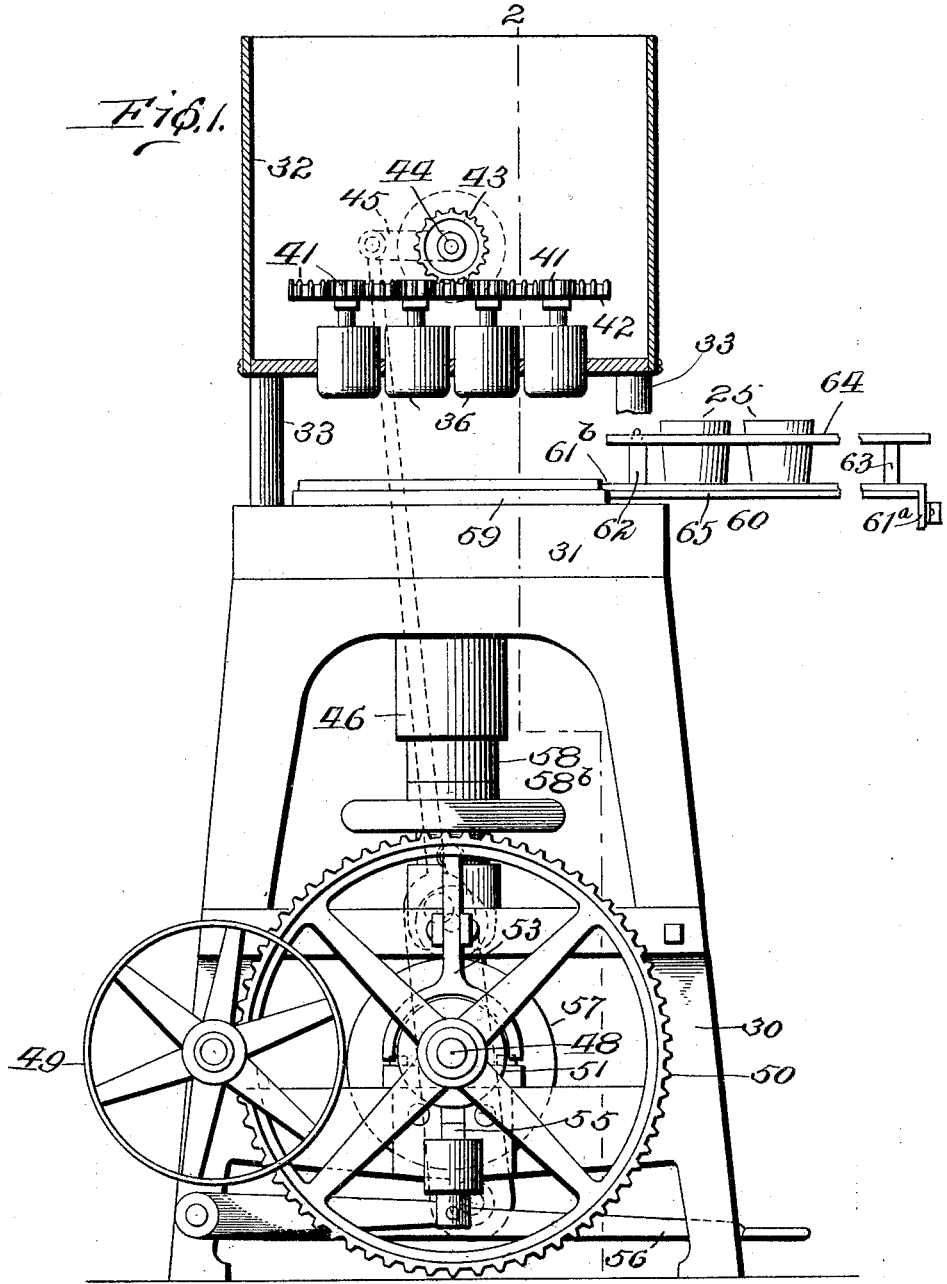

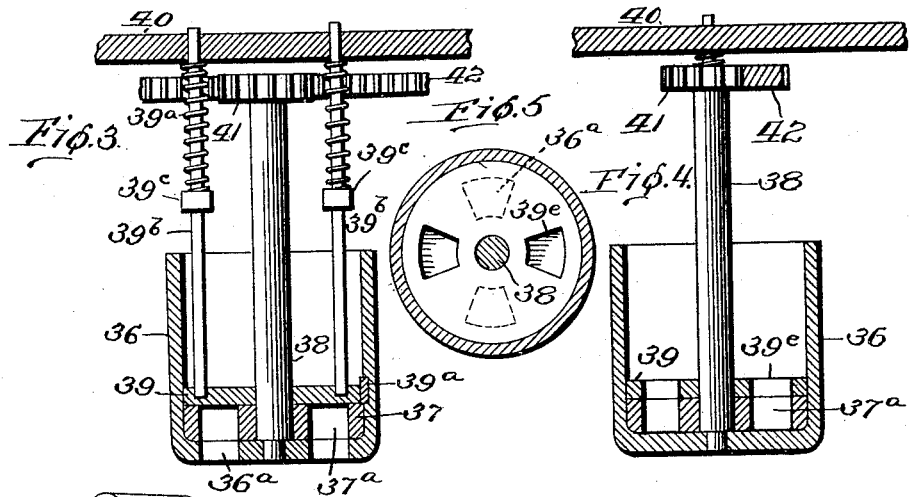
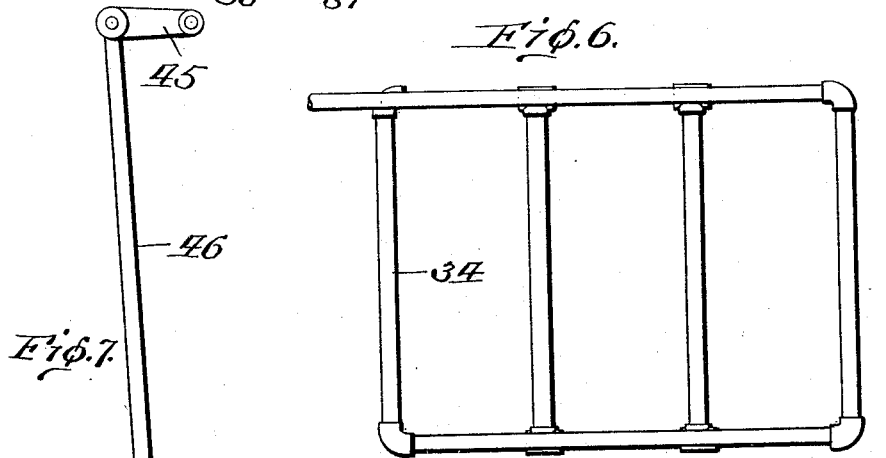
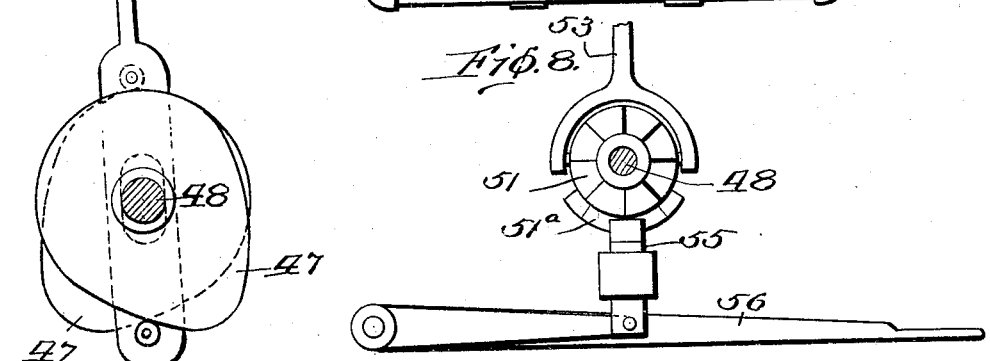

F. GRAEBER.
SEALING FOOD PACKAGES.
APPLICATION FILED APR. 26, 1913.
1,114,747.
Patented Oct. 27, 1914.
4 SHEETS—SHEET 4.
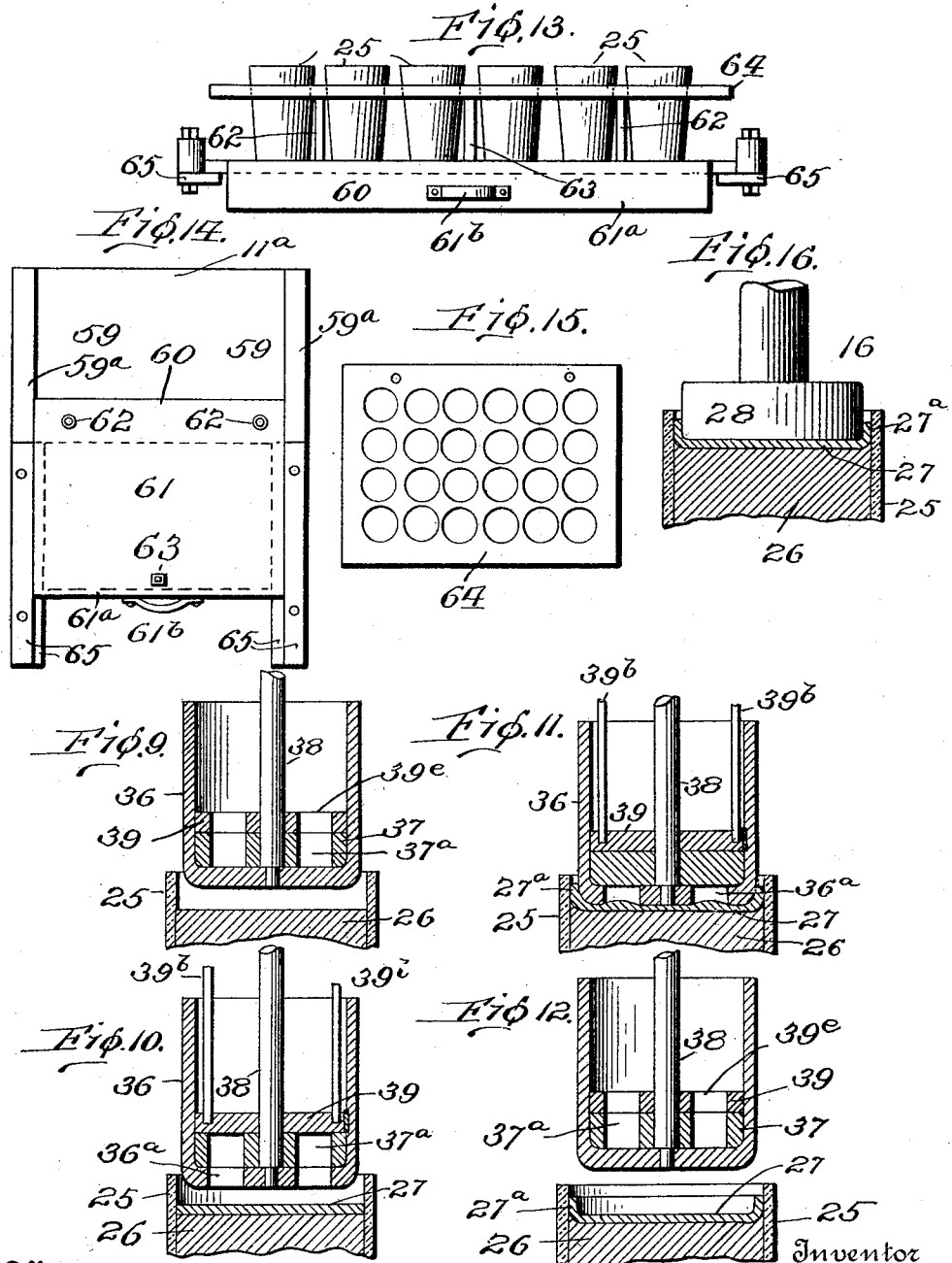

UNITED STATES PATENT OFFICE.

FRANK GRAEBER, OF NORRISTOWN, PENNSYLVANIA, ASSIGNOR TO HERMAN HOWARD HARTING, OF PHILADELPHIA, PENNSYLVANIA.

SEALING FOOD PACKAGES.

1,114,747. Specification of Letters Patent. Patented Oct. 27, 1914.

Application filed April 26, 1913. Serial No. 763,815.

*To all whom it may concern:*

Be it known that I, FRANK GRAEBER, a citizen of the United States, residing at Norristown, in the county of Montgomery and State of Pennsylvania, have invented new and useful Improvements in Sealing Food Packages, of which the following is a specification.

My invention relates to packaging food products and more particularly to the providing of packages of this type with a paraffin coating, the present application being drawn to the apparatus employed in producing the packaged article.
The packaged article itself and the method of producing the same, hereinafter set forth, are not claimed in this application as they form the subject matter of a divisional application S. No. 795,104, filed October 14, 1913, in response to the requirement of the United States Patent Office.

In packaging food products, such as jellies, etc., the container is generally in the form of a glass tumbler, and after the jelly is placed therein, a coating of paraffin is applied to the exposed surface of the jelly. This coating has generally been in the form of a relatively flat layer of paraffin of substantially equal thickness throughout the coating, the result being that either a relatively thick layer must be employed in order to provide the periphery of the coating with a surface of sufficient extent to provide the proper adhesion to the glass, or where the layer has been comparatively thin, such peripheral contact has been insufficient to provide the proper excluding qualities as well as adhesion to the glass.

The present invention contemplates the forming of a comparatively thin layer with a peripheral surface adapted to contact with the glass, said contacting surface being of greater length lengthwise of the glass than the thickness of the layer, this being provided by displacing the paraffin while in its liquid state so as to decrease the thickness of the initial layer, the displaced material being forced along the glass surface so as to cause it to extend above the top plane of the main portion of the layer, providing the appearance somewhat of a dish shaped coating, the lower surface of the layer, however, extending throughout the area of the exposed face of the jelly, the result being that without increasing the amount of paraffin required, a coating of sufficient thickness for the desired purpose is provided, and at the same time a maximum peripheral surface in contact with the glass is produced.

Among the objects of my invention, therefore, are to be found the production of a food product package having a paraffin coating of the characteristics above indicated; the provision of a method for producing such package, and the provision of apparatus which will form one way in which this method may be employed.

Further objects are to provide an apparatus which is capable of providing the paraffin coating to a multiplicity of containers simultaneously, the apparatus being simple and efficient in operation, durable in construction and which can be manufactured and operated at a relatively low cost.

To these and other ends, the nature of which will be readily understood as the invention is hereinafter disclosed, my invention consists in the improved package, the method by means of which such package may be provided, and the improved construction and combination of parts embodying the apparatus adapted to form a way in which the method may be employed, all as hereinafter fully described, illustrated in the accompanying drawings, and more particularly pointed out in the appended claims.

In the accompanying drawings in which similar reference characters indicate similar parts in each of the views, Figure 1 is a view partly in section and partly in end elevation of a machine adapted to carry out the embodiment of my invention. Fig. 2 is a sectional view taken on the line 2—2 of Fig. 1. Figs. 3 and 4 are vertical sections of the valve structures, these views showing different positions of the valves. Fig. 5 is a horizontal sectional view of one of the valve containing cups. Fig. 6 is a detail plan view of a coil structure adapted to heat the paraffin. Fig. 7 is a detail view of the mechanism for manipulating the valve operating mechanism. Fig. 8 is a detail view of the clutch mechanism. Figs. 9 to 12, inclusive, are views, somewhat diagrammatic, illustrating the method in which the coating is produced by the apparatus herein disclosed. Figs. 13, 14 and 15 are detail views of the carrier for the containers. Fig. 16 is a detail view showing a simple way in which my method may be carried out.

The package with its paraffin coating formed in accordance with my present invention is shown, somewhat diagrammatically, at the bottom of Fig. 12, the glass or container being indicated at 25, the food products at 26, and the coating at 27, the coating being shown as in the form of a comparatively thin layer with a flange $27^a$ projecting upwardly peripherally of the layer and in contact with the inner face of the glass, thus making an extended peripheral contact with the glass, and at the same time providing a relatively thin layer of sufficient thickness, however, to provide the desired excluding qualities. It is to be understood, however, that the present invention is not limited to a thin layer, nor to the amount of projection of the flange $27^a$ to provide the peripheral contact, these necessarily varying according to the particular food products being packaged as well as to meet the desires of the user, the main feature being that the thickness of the layer be increased peripherally at its point of contact with the glass and lengthwise of the glass, it being preferred that the increase be on the side of the layer opposite that of the food products. The method by which this result is obtained is shown diagrammatically in Figs. 9 to 12, consisting in forming a layer of liquid paraffin on the top of the food products within the glass, preferably in measured quantity, and then placing a suitable plunger of less diameter than the diameter of the glass on the top surface of this layer, while still in liquid state, and applying pressure to the plunger, thereby forcing out air bubbles etc., which may be exposed on the top of the food products and at the same time displacing a portion of the paraffin so that it will pass between the sides of the plunger and the glass, the plunger being retained in position sufficiently long to permit the paraffin to set, after which the plunger is withdrawn. A simple form for producing this result is shown in Fig. 16, in which the plunger is indicated at 28. As a result, the layer is expanded along its periphery and provides a relatively wide surface contact with the glass and thus produces a maximum excluding effect.

In order, however, that this packaging may be employed commercially to provide a maximum output, I preferably employ apparatus for carrying the method into effect, one form of such apparatus being shown in the drawings, in which 30 designates a supporting frame having a bed 31 on which is mounted a tank 32, the bottom of which is preferably spaced from the top of the bed as by pillars 33.

The tank is preferably of a size to contain a considerable quantity of paraffin, and for the purpose of maintaining it in a liquid state, I preferably employ a heating coil 34 suitably arranged for the purpose of maintaining the paraffin liquid, one way in which this may be provided being shown in Figs. 1, 2 and 6, in which the coil is shown as extending from a point adjacent the top of the tank to a point adjacent the bottom thereof, suitable cross connections being employed for the purpose of increasing the heating effect. The coil is adapted to be connected to a suitable source of supply, either steam or hot water, and is of a form which will insure that the paraffin in the tank be maintained in liquid state, and especially that portion adjacent the bottom of the tank. If desired, a drainage cock 35, may be employed for clearing the tank.

The apparatus herein disclosed is adapted to apply the coating to a plurality of containers, the disclosure of the drawings showing a structure adapted to simultaneously operate on two dozen containers. These containers are adapted to be placed in a predetermined position on a vertically movable carrier so as to locate them below a corresponding number of valve structures carried by the bottom of the tank. As these structures are substantially similar, but one of them will be described.

36 designates a cup-shaped receptacle which is secured within the bottom of the tank, preferably projecting above and below the planes of such bottom, it being essential that it project below, but, if desired, it may not project above, although this latter is preferred in order that sediment, etc., which may be contained within the paraffin will not have a tendency to drain into the cup. The bottom of the cup is provided with one or more openings $36^a$ (I prefer to employ two openings), these openings being spaced apart and forming the discharge openings for the paraffin.

37 designates a valve member which is carried by a stem 38, the latter being suitably mounted for rotation or oscillation, said stem extending through a cut-off plate 39 mounted within the cup above the valve and preferably held against rotation by suitable means such as a spline $39^a$. I preferably render the plate 39 yieldable slightly, and for this purpose I may employ rods $39^b$ carrying a collar $39^c$ between which and a bar 40 hereinafter referred to, is mounted a spring $39^d$; I preferably employ two of these structures approximately diametrically opposed with respect to the plate. The plate 39 is preferably provided with one or more openings 39ᵉ (the number corresponding to the number of openings 36ᵃ), the openings 39ᵉ being positioned out of vertical alinement with the openings 36ᵃ, a preferable arrangement being shown in Fig. 5, in which the openings 36ᵃ are shown in dotted lines. The valve 37 is also provided with a similar number of openings 37ᵃ and in the operation of the apparatus, the valve is positioned to have its openings 37ᵃ in alinement with the openings 39ᵉ when the apparatus is at rest, the valve in this position, being adapted to receive the paraffin, the latter filling the openings 37ᵃ as well as the openings 39ᵉ.

As will be readily understood, a movement of the valve in a rotary direction will carry its openings out of alinement with the openings 39ᵉ and into alinement with the openings 36ᵃ, the movements of the valve between these positions providing for the segregating of the proper amount of paraffin for use in providing the coating for a single container, the valve receiving the paraffin through the openings 39ᵉ and discharging it through the openings 36ᵃ. As will be understood, the movement of the valve in passing from its receiving to its discharging position will act to cut off the supply when the openings 37ᵃ have passed out of alinement with the openings 39ᵉ.

As will be obvious, the size of the openings 37ᵃ, will determine the amount of paraffin discharged, the normal amount being about a spoonful. The cups 36 are preferably arranged in rows, and each stem 38 is provided with a pinion 41. The pinions 41 are operatively connected to a plurality of racks 42, each rack preferably operating the pinions of two rows of cups, the racks each being located between the rows and having teeth on its edges. For the purpose of operating the racks, I employ suitable pinions 43 mounted on a shaft 44 above the racks, the latter having teeth on their upper faces adapted to engage with the pinions 43. The shaft is adapted to be oscillated by means of a crank 45 having one end carried by the shaft and having its other end connected to a connecting rod 46, the opposite end of which is adapted to be mounted to be actuated by one or more cams 47 carried by the drive shaft 48. As the complete cycle of movements of the valves must take place during but a portion of the revolution of the drive shaft, for a purpose hereinafter referred to, I preferably employ two cams 47 so arranged as to provide for positive movements of the valves in both directions and at proper time intervals. A preferable form of cam arrangement is shown in Figs. 2 and 7.

The drive shaft 48 is driven from a suitable source of power, the drawings illustrating fast and loose pulleys 49 for this purpose. However, it is desired that while the operation of the apparatus be automatic, such automatic action shall limit the movements of the shaft 48 to one complete revolution, the successive revolutions of this shaft being at the will of the operator. For this purpose, I operatively connect the fast pulley to a gear 50 loose on the shaft 48, and provide a friction clutch structure which is adapted to be operated at will and which will automatically cause a disengagement when a complete revolution of the shaft 48 is had. One way in which this result can be produced is shown in Figs. 1, 2 and 8, in which 51 and 52 designate the opposing members of a clutch mechanism, the member 51 being adapted to move longitudinally of the shaft 48 to rotate therewith, the movement of the member 51 into engagement with the member 52 acting to couple the shaft to the power. In order that this may be accomplished at will, I employ a lever 53 having one end engaging the member 51 and having its opposite end connected to a spring 54, the latter tending to throw the member 51 into engagement with the member 52. For the purpose of retaining the members 51 and 52 out of engagement, I employ a suitable stop element 55 adapted to be moved into and out of the path of movement of a flange 51ᵃ carried by the member 51. The element 55 preferably carries a roller at its upper end, which roller is adapted to engage said flange 51ᵃ, a movement of the element 55 in one direction serving to withdraw it out of the path of the flange 51ᵃ, thus permitting the spring 54 to throw the clutch into engagement. To provide this movement to the element 55, I employ a foot lever 56; this lever is preferably spring supported in order that when the lever or treadle 55 is released, it will return to normal position, and in such position will be located in the path of movement of a cam like portion of the flange 51ᵃ the action of which is to retract the member 51 and disengage the clutch, thus stopping the movement of the shaft 48.

From the above it will be understood that the valve structures, being carried by the tank bottom, are held against vertical movement, and since the cups 39 provide the function of the plunger 28 heretofore referred to, it will be understood that in the apparatus herein described, it is necessary that the containers be moved toward and from the cups. This action is provided by the employment of a suitable cam 57, mounted on the shaft 48, said cam being adapted to provide movement to a vertically reciprocating member 58, said member being adapted to extend through the bed 31 and having its upper end provided with a suitable carrier for the containers. This carrier may be in the form of a flat plate provided with suitable means for positioning the containers thereon in proper location, but I prefer to employ the structure shown herein in which the upper end of the member 58 is provided with a plate 59 having suitable guides 59$^a$ adapted to guide a removable carrier 60, the latter being preferably in the form of a flat plate 61 having a stop 61$^a$ at its front and provided with a handle 61$^b$. The plate is provided with a pair of dowel pins 62 and a supporting post 63, these pins and post being adapted to support a plate 64 having openings to receive the containers, the latter preferably resting on the plate 61. This particular construction forms an efficient carrier in which the plate 64 may be lifted off of the pins and post and carried away, thus enabling the containers to be placed in position at a point removed from the apparatus and then carried thereto and by positioning the plate on the dowel pins so as to prevent the plate from twisting, the containers will be properly positioned on the plate 61.

I preferably form guide flanges 65 in advance of the plate 59 to receive the carrier 60, the latter then being pushed on to the plate 59 until contact is had therewith by the stop 61$^a$, this having the effect of properly positioning the containers below the cups 36. As it is possible that paraffin may drop onto the upper face of the plate 59, I preferably form the plate 61 with a beveled edge 61$^b$, this edge being adapted to scrape off such paraffin as may have passed onto the plate 59 and carry it to the rear end of said plate 59 onto a chute from where it passes into a receptacle 66.

In order to accommodate for various lengths of containers, I preferably mount the member 58 adjustably, as by the use of a threaded member 58$^a$ and a wheel 58$^b$, the rotation of which has the effect of raising or lowering the plate 59 and thus adjusting the normal position of said plate 59. The length of travel of the plate 59 being similar by the use of the cam 57 regardless of such adjustment, it will be understood that such adjustment provides for meeting the various conditions required in packaging the various products.

The operation of the apparatus herein disclosed is substantially as follows: It being assumed that the tank 32 is provided with a sufficient amount of paraffin in liquid state, and that the carrier 60 has been placed in position with the containers below the cups 36, the treadle 56 is depressed, thus connecting the shaft 48 with the drive. The rotation of the shaft 48 causes the several cams to become effective, the cam 57 raising the carrier with the containers thereon toward the valve structures. As the containers approach the cups, the valves are moved so as to bring the openings 37$^a$ into alinement with the openings 36$^a$, thus permitting the measured paraffin to drop on to the exposed surface of the food product which may be within the container, the liquid forming a layer thereon. The further movement of the shaft causes the carrier to continue its upward movement and at the same time returns the valve to its normal position, thus taking away the openings 37$^a$ from out of alinement with the openings 36$^a$, to prevent a return of the paraffin thereinto. This upward movement of the carrier then brings the upper surfaces of the paraffin layers into contact with the bottoms of the cups, and as the cups are of less diameter than the diameter of the glass or container, it will be readily understood that the further movement of the carrier will cause pressure to be applied on the paraffin layer to displace a portion thereof and cause it to pass around the side wall of the cup adjacent the bottom, the slight amount of paraffin which may pass within the openings 36$^a$ being negligible. This displacement acts to provide the flange and at the same time causes the air bubbles to be broken, and the air expelled around the side of the glass. In this connection the particular location of the cups becomes of importance, in that the heated paraffin will tend to keep the walls of the cups heated to a certain extent and consequently the paraffin layer will not become hardened to an extent which would prevent the proper operation, with respect to the discharge of air bubbles and the formation of the flange and its close contact with the walls of the glass. The continued movement of the shaft 48 then acts to return the carrier to its normal inoperative position, whereupon the clutch mechanism is disengaged, after which the carrier may be removed at will and a new set of containers be placed in position to repeat the operation.

As will be readily understood, the apparatus above described will provide not only an efficient packaging operation, but will also provide it with rapidity, all operations, with the exception of the positioning and removing of the carrier being automatic, so that a maximum output of the apparatus is provided.

While I have shown and described a method for producing the package referred to, as well as an apparatus which will provide this result with efficiency, it will be readily understood that changes and modifications therein may be required or desired to meet the exigencies of use, and I desire to be understood as reserving the right to make such changes and modifications as may be necessary or desirable in this connection in so far as the same may fall within the spirit and scope of the invention as expressed in the accompanying claims. Also, in the use of terms throughout the specification and claims I contemplate all equivalents in meaning and in parts or materials. for instance, the term paraffin typifies and includes all sealing materials which may be used in a similar manner.

Having thus described my invention, what I claim as new is:

1. In apparatus for applying paraffin coating to packages of food products, means for supplying liquid paraffin in predetermined quantity to the food product container, a carrier for the container, and mechanism for providing relative movements between the carrier and said means, said relative movements successively providing for the formation of a layer on the contents of the container, then bringing the means in contact with the layer, and finally placing pressure on the layer to displace it laterally at its periphery to form a flange.

2. In apparatus for applying paraffin coating to packages of food products, means for supplying liquid paraffin in predetermined quantity to the food product container, a carrier for the container, and mechanism for providing relative movements between the carrier and said means, said relative movements successively providing for the formation of a layer on the contents of the container, then bringing the means in contact with the layer, and finally placing pressure on the layer to displace it laterally at its periphery to form a flange, said means including an element combining with the container to form spaced apart mold walls for the flange.

3. In apparatus for sealing food packages, a movable carrier for the food-product container, a liquid paraffin supply including an element adapted to deliver the paraffin in predetermined quantity, said element being located within the path of movement of the container, said element and the container being relatively sized to form opposing mold walls with an annular space therebetween to receive paraffin displaced by the element contacting with the layer during movements of the carrier.

4. In apparatus for sealing food packages, a movable carrier for the food-product container, a liquid paraffin supply including an element adapted to deliver the paraffin in predetermined quantity, said element being located within the path of movement of the container, said element and the container being relatively sized to form opposing mold walls with an annular space therebetween to receive paraffin displaced by the element contacting with the layer during movements of the carrier, said element including a valve structure adapted to segregate and deliver the paraffin to the container.

5. In apparatus for sealing food packages, a movable carrier for the food-product container, a liquid paraffin supply including an element adapted to deliver the paraffin in predetermined quantity, said element being located within the path of movement of the container, said element and the container being relatively sized to form opposing mold walls with an annular space therebetween to receive paraffin displaced by the element contacting with the layer during movements of the carrier, said element including a valve structure adapted to segregate and deliver the paraffin to the container, said movements of the valve structure being operative prior to the displacing contact of the element and layer.

6. In apparatus for sealing food packages, a movable carrier adapted to removably receive a plurality of containers for food products, a liquid paraffin supply having a plurality of independent elements adapted to deliver the paraffin in predetermined quantities to the containers, said elements being located within the path of movement of said containers, each element and the container which it supplies being relatively sized to form opposing mold walls with an annular space therebetween, the element being positioned to contact with the surface of the layer provided by the delivered paraffin prior to the completion of the movement of the carrier in one direction, whereby such movement will provide a pressure on the layer to partially displace it within the annular space.

7. In apparatus for sealing food packages, a tank adapted to receive the paraffin, said tank having means for maintaining the paraffin in liquid form, means carried by the tank for forming and delivering predetermined quantities of paraffin from the tank in liquid form, and a carrier movable toward and from said means, said carrier being adapted to position food-product containers relative to said means to receive the paraffin and form a peripherally flanged coating within the container during movements of the carrier.

8. In apparatus for sealing food packages, a tank adapted to receive the paraffin, said tank having means for maintaining the paraffin in liquid form, means carried by the tank for forming and delivering predetermined quantities of paraffin from the tank in liquid form, and a carrier movable toward and from said means, said carrier being adapted to position food-product containers relative to said means to receive the paraffin and form a peripherally flanged coating within the container during movements of the carrier, said means and the container coöperating to form the flange.

9. In apparatus for sealing food packages and in combination, a tank having means for maintaining the paraffin in liquid condition, a plurality of elements carried by the bottom of the tank and projecting below said bottom, each element carrying a rotatable valve structure adapted to segregate and deliver predetermined quantities of the liquid paraffin, a drive shaft, connections between the drive shaft and said valves for providing rotatable movements thereto in unison, and a carrier adapted to move toward and from said elements, said carrier being adapted to position food-product containers in coöperative relation to the elements for producing a paraffin coating on the surface of the food-products.

10. In apparatus for sealing food packages and in combination, a tank having means for maintaining the paraffin in liquid condition, a plurality of elements carried by the bottom of the tank and projecting below said bottom, each element carrying a rotatable valve structure adapted to segregate and deliver predetermined quantities of the liquid paraffin, a drive shaft, connections between the drive shaft and said valves for providing rotatable movements thereto in unison, and a carrier adapted to move toward and from said elements, said carrier being adapted to position food-product containers in coöperative relation to the elements for producing a paraffin coating on the surface of the food-products, said elements also extending above the plane of the bottom of the tank.

11. In apparatus for sealing food packages, a tank having means for maintaining paraffin in liquid state, a valve structure at the bottom of the tank comprising a cup-shaped member having openings in its bottom, a rotatable member above said latter bottom and provided with openings adapted to intermittently register with the openings of the bottom during the movements of the member, and a cut-off plate above said rotatable member, said plate being held from rotation, means being provided for yieldingly retaining the plate in contact with said member, said plate having openings out of alinement with the openings of the cup bottom.

12. In apparatus for sealing food packages, a tank having means for maintaining paraffin in liquid state, a valve structure at the bottom of the tank comprising a cup-shaped member having openings in its bottom, a rotatable member above said latter bottom and provided with openings adapted to intermittently register with the openings of the bottom during the movements of the member, and a cut-off plate above said rotatable member, said plate being held from rotation, means being provided for yieldingly retaining the plate in contact with said member, said plate having openings out of alinement with the openings of the cup bottom, the movements of said member carrying the member openings into registration succesively with the openings of the plate and the cup bottom.

13. In a device for sealing food packages, and in combination; a reciprocating support, a carrier removably mounted on said support, said carrier being adapted to support a plurality of food-product containers, a paraffin supply, and means located within the path of movement of the containers for segregating and delivering to the containers liquid paraffin in predetermined quantities, said means and the containers co-acting to provide a peripherally flanged coating within each container.

14. In a device for sealing food packages, and in combination; a reciprocating support, a carrier removably mounted on said support, said carrier being adapted to support a plurality of food-product containers, a paraffin supply, and means located within the path of movement of the containers for segregating and delivering to the containers liquid paraffin in predetermined quantities, said means and the containers co-acting to provide a peripherally flanged coating within each container, said carrier comprising a plate carrying a stop to locate the carrier with respect to the support, a perforated plate adapted to receive the containers, and members projecting upwardly from the former plate and adapted to receive and support the perforated plate in spaced relation to the first mentioned plate, the perforated plate being removable, said members acting to retain the perforated plate against shifting.

15. In apparatus for sealing food packages, a movable carrier for the food-product container, a liquid sealing material supply including an element adapted to deliver the material in predetermined quantity, said element being located within the path of movement of the container, a support for said container, a drive shaft, a driven shaft, means for operatively connecting said shafts, cam mechanism operated by said driven shaft to control the sealing material delivery, and a cam on said driven shaft arranged to move said support to bring said container into and out of its receiving position.

16. In apparatus for sealing food packages, a movable carrier for the food-product container, a liquid sealing material supply including an element adapted to deliver the material in predetermined quantity, said element being located in the path of movement of said container, a support for said container, a drive shaft, a driven shaft, cam mechanism operated by said driven shaft to control the sealing material delivery, a cam on said driven shaft arranged to move said support to bring said container into and out of its receiving position, a clutch for operatively connecting said driving and driven shafts, means for engaging said clutch at will, and means for automatically disengaging said clutch at the end of the cycle of operations.

In testimony whereof I have hereunto set my hand in presence of two subscribing witnesses.

FRANK GRAEBER.

Witnesses:
HENRY F. CORSON,
H. H. ZIMMERMAN.